Dec. 25, 1934.  A. J. MEYER  1,985,296
ENGINE
Filed April 30, 1930
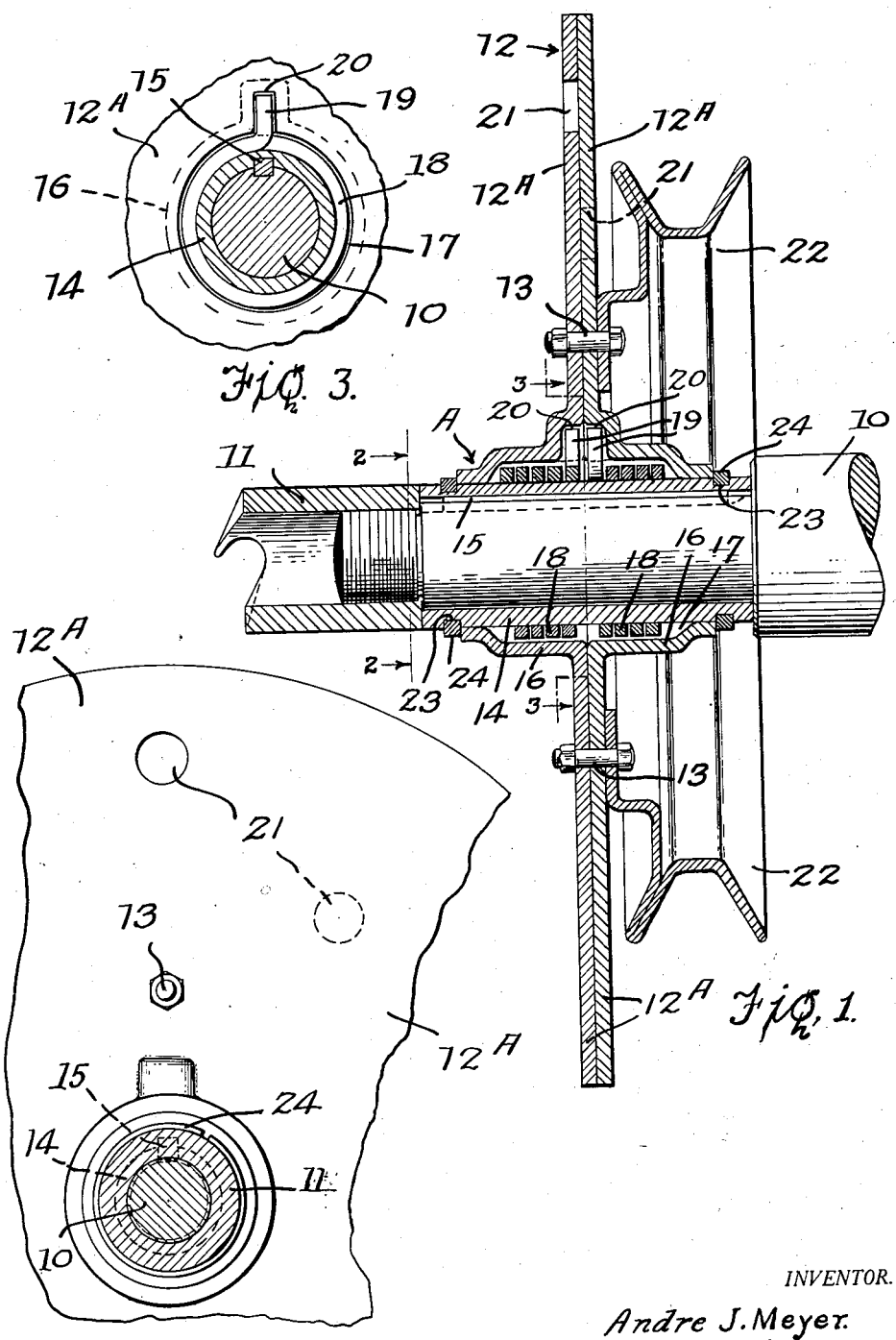
INVENTOR.
Andre J. Meyer.
BY
ATTORNEY.

Patented Dec. 25, 1934

1,985,296

UNITED STATES PATENT OFFICE 1,985,296

ENGINE

Andre J. Meyer, Detroit, Mich., assignor to Continental Motors Corporation, Detroit, Mich., a corporation of Virginia Application April 30, 1930, Serial No. 448,692

8 Claims. (Cl. 74—574)

My invention relates to vibration dampers adapted for assembly with the crankshaft of an internal combustion engine, and more particularly to a vibration damper constructed and arranged to absorb the torsional vibrations of the engine crankshaft.

Some difficulty has been experienced in the past in constructing a torsional vibration damper which will uniformly dampen out vibrations at various engine speeds and in which wear of the various damper elements is held to a minimum.

It is the object of my present invention to overcome the difficulties mentioned above by providing a vibration damper that will effectively and uniformly dampen out crankshaft vibrations at various engine speeds.

Another object of my invention is to reduce wear of the damper parts to a minimum by providing a yieldable means for connecting the inertia member with the driving hub and which yields internally instead of slipping with respect to the adjoining damper part to which it is yieldingly connected.

A further object of my invention is to reduce the manufacturing costs of a crankshaft vibration damper by providing a simplified damper structure of a minimum number of parts which may be very readily and conveniently assembled together and to the engine crankshaft.

For a more detailed understanding of my invention, reference may be had to the accompanying drawing which illustrates one form which my invention may assume, and in which:

Fig. 1 is a longitudinal sectional view of a vibration damper constructed in accordance with my invention and showing the same secured to an engine crankshaft, Fig. 2 is a transverse sectional view thereof taken substantially on the line 2—2 of Fig. 1, and Fig. 3 is another transverse sectional view taken substantially on the line 3—3 of Fig. 1.

I have illustrated my vibration damper as secured to the forward end of an engine crankshaft 10, a starter element 11 being secured to the end of the crankshaft in the usual manner, and serving to retain the vibration damper structure on the crankshaft. My improved vibration damper structure A comprises an inertia member 12 preferably constructed of a pair of complementary sheet metal discs 12—A or flywheel members secured together back to back by means of bolts 13 or other suitable fastening devices. A driving hub 14 is fixed to the crankshaft by means of a key 15, the inertia member being preferably rotatably supported on the driving hub. The discs 12A are provided with the flanged hub portions 16, the extreme outer portions of which are reduced in diameter to have a bearing on the driving hub. The inner portions of the hub portions are spaced radially of the driving hub to provide an annular chamber 17 surrounding the hub.

Means for yieldingly connecting the inertia member with the driving hub are housed within this annular chamber. This yielding connecting means comprises a pair of oppositely coiled springs 18, each having one end turned out as at 19 and anchored in a recess 20 carried by the discs 12A. The springs are coiled around the driving hub and yieldingly grip the same. Thus, it will be noted that one end of each spring is anchored or fixed to the inertia member while the other end of each spring is yieldingly engaged with the hub. Each disc 12A is provided with a hole 21 in which a suitable tool may be inserted and the discs moved relative to each other to partially set the coil springs for creating a predetermined pressure or force in the springs that yieldingly engage the driving hub. When the required force has been obtained the bolts 13 may be assembled to secure the discs together. Preferably a sheet metal pulley structure 22 is secured to these discs by the same bolts which fasten the discs together.

The driving hub may be provided with a pair of spaced annular grooves 23 in which split spring circlips 24 may be snapped for securing the inertia member on the driving hub.

It will be noted that relative movement between the inertia member and driving hub in one direction will cause one of the coil springs to wind up around the hub and more firmly grip the same, while the other spring is unwound from the hub. Relative movement between the inertia member and driving hub in the opposite direction will reverse the above described spring action. Thus vibrations in the crankshaft will be absorbed by the springs, an acceleration of the inertia member being absorbed by one spring while a de-acceleration of the inertia member will be absorbed by the other spring.

The end portion of each spring which yieldingly engages the driving hub, grips the hub with sufficient force to prevent the same from slipping thereby substantially reducing wear to a minimum. As more tension is imparted to one spring or the other due to the winding up of the spring, the spring thus energized more firmly grips the hub.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. A vibration damper for engine crankshafts, comprising a driving hub member fixed to the crankshaft, an inertia member, and a pair of oppositely wound coil springs disposed intermediate the said members, each having one end fixed to one of said members and the other end yieldingly engaging the other member for providing a yielding driving connection between said members, relative movement of said members in one direction acting to uncoil one of said coil springs and relative movement of said members in the other direction acting to uncoil the other of said coil springs.

2. A vibration damper for engine crankshafts, comprising a driving hub member fixed to the crankshaft, an inertia member and a pair of oppositely wound coil springs surrounding said driving hub and each having one end fixed to the inertia member and the other end yieldingly engaging the hub to provide a yielding driving connection between the hub and inertia member.

3. A vibration damper for engine crankshafts, comprising a driving hub member fixed to the crankshaft, an inertia member, and a pair of oppositely wound coil springs spirally coiled around said hub, the adjacent ends of each spring fixed to the inertia member and the end portions of the spring most remote from each other yieldingly engaging the hub to provide a yielding driving connection between the hub and inertia member.

4. A vibration damper for engine crankshafts, comprising a driving hub member fixed to the crankshaft, an inertia member, and a pair of coil spring elements around said hub and each having one end fixed to the inertia member and the other end yieldingly engaged with said hub, said spring elements constructed and arranged to be actuated in response to relative movement between the hub and inertia member, such relative movement in one direction actuating one of said spring elements to wind the same on said hub while unwinding the other spring element on said hub, while such relative movement in the opposite direction unwinds the first mentioned spring element on said hub and winds the secondly mentioned spring element on said hub.

5. A vibration damper for engine crankshafts, comprising a driving hub member fixed to the crankshaft, an inertia member, and a pair of coiled springs each having one end fixed to the inertia member and the other end portion yieldingly engaged with the hub, one spring being constructed to wind up on said hub in response to relative movement of hub and inertia member in one direction and the other spring being constructed to wind up on said hub in response to relative movement of hub and inertia member in the opposite direction.

6. A vibration damper for engine crankshafts comprising a driving hub fixed to the crankshaft, an inertia member rotatably supported on said hub and constructed to provide an annular chamber surrounding said hub, and a pair of oppositely coiled spring elements located within said annular chamber and surrounding the hub and each having one end fixed to the inertia member and the other end yieldingly engaged with said hub.

7. A vibration damper for engine crankshafts, comprising a driving hub member fixed to the crankshaft against relative rotation, an inertia member rotatably mounted on said driving hub member, and means providing a yielding driving connection between said members, said means including separate yieldable elements, one of said elements coiled around the driving hub actuated in response to relative movement of the members in one direction and the other element actuated in response to relative movement of the members in the opposite direction, said elements each having one end fixed to one of said members and the other end yieldingly engaged with said other member.

8. A vibration damper for engine crankshafts, comprising a driving hub member fixed to the crankshaft against relative rotation, an inertia member rotatably mounted on said driving hub member, said means including separate coil springs coiled around the driving hub, one of said coil springs actuated in response to relative movement of the members in one direction and the other coil spring actuated in response to relative movement of the members in the opposite direction, each of said coil springs having one end fixed to one of said members and the other end yieldingly engaged with said other member.

ANDRE J. MEYER.